United States Patent [19]

Ohmori

[11] 4,198,591
[45] Apr. 15, 1980

[54] VERTICAL DEFLECTING CIRCUIT

[75] Inventor: Masayuki Ohmori, Tokyo, Japan

[73] Assignee: Sony Corporation, Tokyo, Japan

[21] Appl. No.: 934,033

[22] Filed: Aug. 16, 1978

[30] Foreign Application Priority Data

Aug. 18, 1977 [JP] Japan .................................. 52-98979

[51] Int. Cl.$^2$ ........................................... H01J 29/70
[52] U.S. Cl. ................................. 315/371; 315/393; 358/60
[58] Field of Search ................... 315/371, 393; 358/60

[56] References Cited
U.S. PATENT DOCUMENTS

| | | | |
|---|---|---|---|
| 3,115,544 | 12/1963 | Marley | 358/60 |
| 3,697,801 | 10/1972 | Eulenberg | 315/371 |
| 3,700,958 | 10/1972 | Haferl | 315/371 |
| 3,748,531 | 7/1973 | Boekhorst et al. | 315/371 |
| 3,825,793 | 7/1974 | Dietz | 315/371 |
| 3,879,635 | 4/1975 | Findeisen | 315/371 X |
| 3,894,268 | 7/1975 | Reh et al. | 315/371 |
| 4,084,115 | 4/1978 | Peer | 315/371 |

Primary Examiner—Malcolm F. Hubler
Attorney, Agent, or Firm—Lewis H. Eslinger; Alvin Sinderbrand

[57] ABSTRACT

A vertical deflecting circuit for a television receiver having a first signal source for supplying a first signal which has a sawtooth wave shape and a vertical period, second signal source for supplying a corrected signal having a horizontal period, a vertical output circuit for amplifying the first signal, and a vertical deflecting coil connected to the vertical output circuit. In this case, the vertical deflecting circuit further includes a mixing circuit for mixing the first signal and said correcting signal and a resistor connected to the deflecting coil in parallel for forming with the vertical deflecting coil an integrator for the correcting signal.

7 Claims, 5 Drawing Figures

VERTICAL DEFLECTING CIRCUIT

BACKGROUND OF THE INVENTION

1. Field of the Invention

This invention relates generally to a vertical deflecting circuit for a television receiver, and is particularly useful for a vertical deflecting circuit for a television receiver which is used to project an image produced on its cathode ray tube onto a screen through an optical system such as a lens.

2. Description of the Prior Art

In the prior art there is provided an apparatus which projects an image produced on the cathode ray tube of a television receiver onto a screen through an optical system such as a lens. When the apparatus is installed, if the television receiver and projector are positioned in front of the screen, a viewer is hindered from seeing the screen. To avoid this obstacle, the projection of the reproduced picture onto the screen is carried out obliquely, for example, from the lower side of the screen as shown in FIG. 1.

In FIG. 1, the numeral 1 designates an image receiving tube such as a television receiver tube. An image reproduced thereon is projected upward through a lens 2 to a screen 3. This screen 3 is located in front of a viewer 4 in a plane generally perpendicular to the viewing direction 5 of the viewer 4. In this case, the angle between the viewing direction 5 and the projecting direction 6 (optical axis of the lens 2) is selected to be a predetermined angle α.

When the image from tube 1 is projected obliquely onto the screen 3, as set forth above, a bow distortion is caused in a scanning line 7 of screen 3 as shown by the solid line in FIG. 2, in which a dotted line represents the desired scanning line.

Further, when the location of the projecting apparatus is changed, a twist distortion may be caused, for example, by the earth's magnetism, on the television receiver tube 1 and accordingly on on the scanning line 7 of screen 3 magnetism as shown by the solid line in FIG. 3, in which a dotted line represents the desired scanning line.

In order to remove such distortions, the prior art has used a vertical correction deflecting coil in addition to the normal vertical deflecting coil. To this correction deflecting coil a parabolic signal having a horizontal frequency is applied when the bow distortion is desired to be removed, and a sawtooth wave signal having a horizontal frequency is applied when the twist distortion is desired to be removed, or both such signals are applied to achieve the correction of a combination of such distortions. The use of such an additional deflecting coil has the undesirable effect of making the construction of the television apparatus more complicated and its cost more expensive.

A coupling transformer might also be used to correct for such distortion. The secondary side of the coupling transformer would be connected in series to the vertical deflecting coil and the parabolic signal and sawtooth wave signal would be applied to the primary side of the coupling transformer. In this case, unfortunately the apparatus becomes expensive due to the provision requirement of the coupling transformer.

OBJECTS AND SUMMARY OF THE INVENTION

It is an object of the invention to provide a novel vertical deflecting circuit for a television receiver free from the defects inherent in the prior art.

It is another object of the invention to provide a vertical deflecting circuit for a television receiver which can remove the bow and twist distortions with a simple circuit construction.

It is a further object of the invention to provide a vertical deflecting circuit for a television receiver which is inexpensive but which can remove bow and twist distortions.

According to an aspect of the present invention there is provided a vertical deflecting circuit for a television receiver which comprises a first signal source for supplying a first signal having a sawtooth wave shape and a vertical period, a second signal source for supplying a correcting signal having a horizontal period, a mixing means for mixing the first signal and the correcting signal, a vertical output circuit for amplifying a mixed signal from the mixing means, a vertical deflecting coil connected to the vertical output circuit, and a resistor connected to the vertical deflecting coil in parallel, the resistance of the resistor being selected so that the resistor works with the vertical deflecting coil as an integrator for the correcting signal.

The above and other objects features and advantages of the present invention will become apparent from the following description of illustrative embodiments of the invention which are to be read in conjunction with the accompanying drawings.

DESCRIPTION OF THE PREFERRED EMBODIMENTS

The present invention will be hereinafter described with reference to the drawings.

Figure 1:
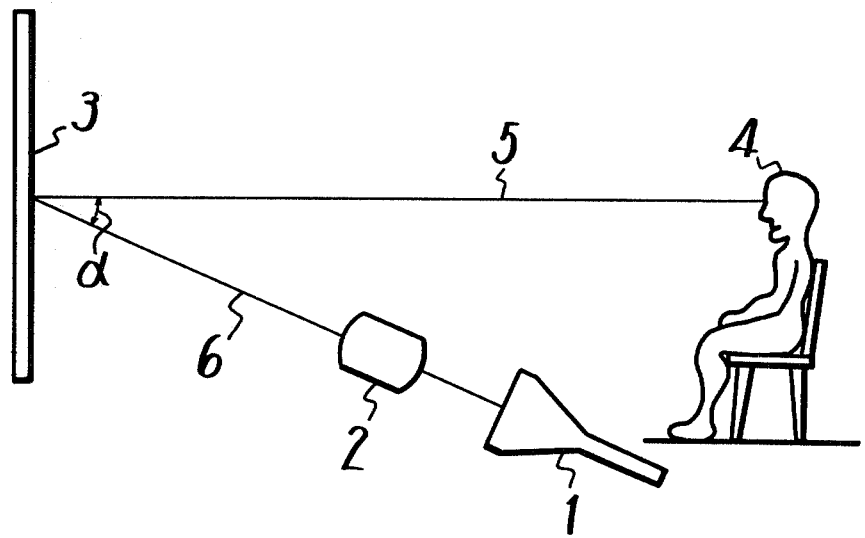
FIG. 1 is a schematic side view showing an image projecting apparatus.
Figure 2:
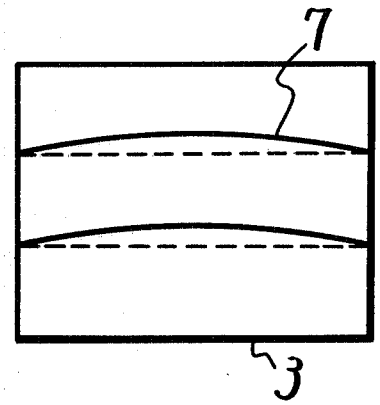
FIGS. 2 and 3 are front views of the screen of the apparatus shown in FIG. 1 used for explaining that apparatus.
Figure 3:
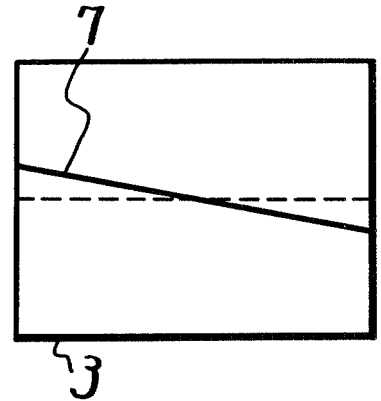
Figure 4:
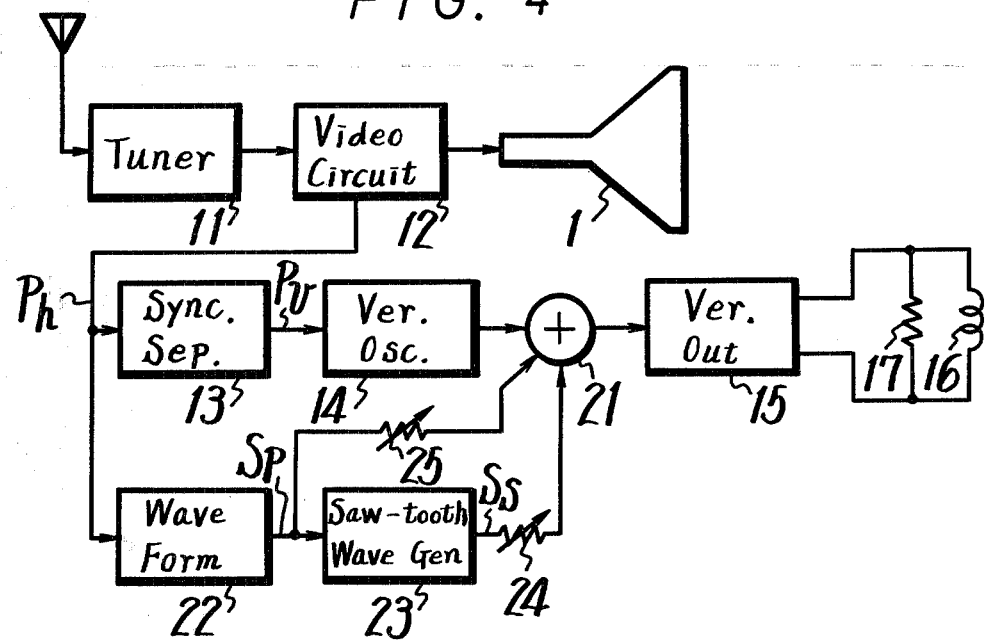
FIG. 4 is a schematic diagram showing, partially in block form, an embodiment of the vertical deflecting circuit for a television receiver according to the present invention.

FIG. 4 show an embodiment of a vertical deflecting circuit for a television receiver according to the present invention. In the example of the invention shown in FIG. 4, the signal from a tuner 11, which is connected to an antenna, is fed through a video circuit 12 to an image receiving tube 1 of the television receiver. A horizontal synchronizing signal Ph derived from the video circuit 12 is fed to a vertical synchronizing signal separating circuit 13, which then separates a vertical synchronizing signal Pv. This vertical synchronizing signal Pv is applied to a vertical oscillating circuit 14 to produce a predetermined sawtooth wave signal which is applied through an adding or mixing circuit 21 to a vertical output circuit 15. This vertical output circuit 15 produces a corresponding current which is then applied across a vertical deflecting coil 16 and a damping resistor 17 which are connected in parallel with each other across the output of the vertical output circuit 15. The horizontal synchronizing signal Ph from the video circuit 12 is also applied to a wave forming circuit 22 to produce a pulse signal $S_p$ having a horizontal period. This pulse signal $S_p$ is applied to a sawtooth wave signal generating circuit 23 which then produces a sawtooth wave signal $S_s$ also having a horizontal period. This sawtooth wave signal $S_s$ and the pulse signal $S_p$ are respectively applied through attenuating circuits 24 and 25 to the adding circuit 21.

Since the sawtooth wave signal, which is applied from the vertical oscillating circuit 14 to the adding circuit 21, is low in frequency, the impedance of the deflecting coil 16 therefor is low. Therefore, almost all of the sawtooth wave signal from the vertical oscillating circuit 14 passes through the deflecting coil 16. On the other hand, the signal $S_s$ from the sawtooth wave signal generating circuit 23 and the pulse signal $S_p$ from the wave forming circuit 22 are both high in frequency, so that the impedance of the deflecting coil 16 to both of them is high. Therefore, the signals $S_s$ and $S_p$ pass through both the deflecting coil 16 and resistor 17, so that both the signals $S_s$ and $S_p$ are integrated by the resistor 17 together with the deflecting coil 16. Thus, the sawtooth wave signal $S_s$ is applied to the deflecting coil 16 as a parabolic signal and the pulse signal $S_p$ is applied thereto as a sawtooth wave signal, respectively.

With the circuit of the invention shown in FIG. 4, if the amplitude of the sawtooth wave signal $S_s$ is adjusted by the attenuating circuit 24, the waveform of the parabolic signal applied to the deflecting coil 16 can be changed to achieve the proper correction for the bow distortion. Also, if the amplitude of the pulse signal $S_p$ is adjusted by the attenuating circuit 25, the inclination of the sawtooth wave signal applied to the deflecting coil 16 can be changed to achieve the proper correction for the twist distortion.

As described above, according to the present invention both the bow and twist distortions can be corrected. In the present invention there is of no need to provide an additional correction deflecting coil or, a coupling transformer. As a result, the circuit of this invention is simple in construction and hence can be made inexpensively.

Figure 5:
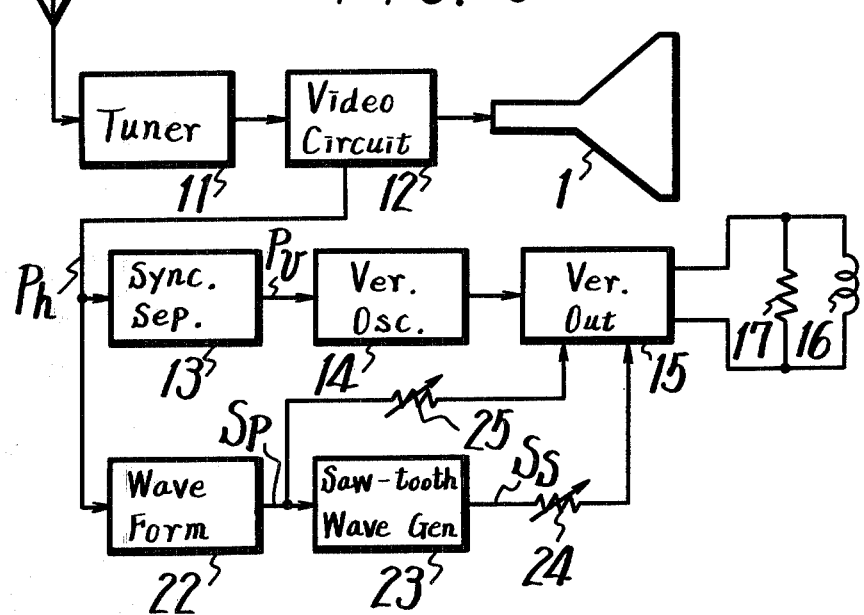
FIG. 5 is a schematic diagram showing, partially in block form, another embodiment of the invention.

FIG. 5 is a schematic diagram showing, partially in block form, another example of the invention. In this example, both the sawtooth wave signal $S_s$ and pulse signal $S_p$ are supplied to the current feedback circuit of the vertical output circuit 15. In this manner these signals can be mixed with the output of vertical oscillator 14 without the use of the adding circuit 21 required in the example of FIG. 4. The rest of the circuit shown in FIG. 5 is substantially same as that shown in FIG. 4, and the operation of the example of FIG. 5 is substantially same as that of the example shown in FIG. 4. The elements of FIG. 5 corresponding to those of FIG. 4 are marked with the same reference numerals as those of FIG. 4 and their detailed description will be omitted for the sake of brevity.

Having described specific preferred embodiments of the invention with reference to the accompanying drawings, it is to be understood that the invention is not limited to those precise embodiments, and that various changes and modifications may be effected thereby by one skilled in the art without departing from the scope or spirit of the invention as defined in the appended claims.

What is claimed is:

1. In a vertical deflecting circuit for a television receiver of the type having
   a first signal source for supplying a first signal having a sawtooth wave shape and a vertical period,
   a second signal source for supplying a correcting signal having a horizontal period,
   a vertical output circuit for amplifying said first signal,
   a vertical deflecting coil connected to said vertical output circuit,
   the improvement comprising:
   mixing means for mixing said first signal and said correcting signal, and
   a resistor connected in parallel with said deflecting coil and being of a proper resistance for forming an integrator with said vertical deflecting coil for integrating said correcting signal.

2. A vertical deflecting circuit for a television receiver, comprising:
   a first signal source for supplying a first signal having a sawtooth wave shape and a vertical period;
   a second signal source for supplying a correcting signal having a horizontal period;
   mixing means for mixing said first signal and said correcting signal to provide a mixed signal;
   a vertical output circuit for amplifying said mixed signal from said mixing means;
   a vertical deflecting coil connected to said vertical output circuit; and
   a resistor connected in parallel with said vertical deflecting coil, the resistance of said resistor being selected so that said resistor cooperates with said vertical deflecting coil to form means for integrating said correcting signal.

3. A vertical deflecting circuit according to claim 2; wherein said correcting signal has a pulse shaped signal component and said means for integrating formed by said resistor and said deflecting coil integrates said pulse shaped signal component into a sawtoothed shaped signal component.

4. A vertical deflecting circuit according to claim 2; wherein said correcting signal has a sawtooth shaped signal component and said means for integrating formed by said resistor and said deflecting coil integrates said sawtoothed shaped signal component into a parabolic shaped signal component.

5. A vertical deflection circuit for a projection-type television receiver which has a cathode ray tube and means for obliquely projecting an image from said tube upon a viewing screen, comprising:
   first signal producing means for producing a first signal having a sawtooth wave shape and a vertical period;
   second signal producing means for producing a correcting signal having a horizontal period;
   mixing means for mixing said first signal and said correcting signal so as to provide a mixed signal therefrom;
   vertical output means for amplifying said mixed signal from the mixing means;
   a vertical deflecting coil connected to said vertical output means; and
   a resistor connected in parallel with said vertical deflecting coil, the resistance of said resistor being selected so that said resistor cooperates with said vertical deflecting coil to form means for integrating said correcting signal.

6. A vertical deflection circuit as in claim 5; wherein said correcting signal has a pulse shaped signal component, and said resistor and said vertical deflecting coil integrate said pulse shaped signal component into a sawtoothed shaped signal component.

7. A vertical deflection circuit as in claim 5; wherein said correcting signal has a sawtoothed shaped signal component, and said resistor and said vertical deflecting coil integrate said sawtoothed shaped signal component into a parabolic shaped signal component.

* * * * *